US007519995B2

(12) United States Patent
Cho et al.

(10) Patent No.: US 7,519,995 B2
(45) Date of Patent: Apr. 14, 2009

(54) PROGRAMMABLE HARDWARE FOR DEEP PACKET FILTERING

(75) Inventors: Young H. Cho, Chatsworth, CA (US); William H. Mangione-Smith, Kirkland, WA (US)

(73) Assignee: Regents of the University of California, Oakland, CA (US)

( * ) Notice: Subject to any disclaimer, the term of this patent is extended or adjusted under 35 U.S.C. 154(b) by 0 days.

(21) Appl. No.: 11/587,292

(22) PCT Filed: Apr. 19, 2005

(86) PCT No.: PCT/US2005/013629

§ 371 (c)(1),
(2), (4) Date: Aug. 23, 2007

(87) PCT Pub. No.: WO2005/104443

PCT Pub. Date: Nov. 3, 2005

(65) Prior Publication Data

US 2008/0047008 A1 Feb. 21, 2008

Related U.S. Application Data

(60) Provisional application No. 60/563,435, filed on Apr. 19, 2004.

(51) Int. Cl.
*G06F 11/30* (2006.01)
(52) U.S. Cl. .......................................... 726/22; 713/188
(58) Field of Classification Search ....................... None
See application file for complete search history.

(56) References Cited

U.S. PATENT DOCUMENTS 7,134,143 B2 * 11/2006 Stellenberg et al. ............ 726/25

| | | | | |
|---|---|---|---|---|
| 7,444,515 B2 * | 10/2008 | Dharmapurikar et al. | ... | 713/176 |
| 2004/0093513 A1 * | 5/2004 | Cantrell et al. | .............. | 713/201 |
| 2004/0151382 A1 * | 8/2004 | Stellenberg et al. | ......... | 382/219 |
| 2004/0174820 A1 * | 9/2004 | Ricciulli | ..................... | 370/245 |
| 2004/0202190 A1 * | 10/2004 | Ricciulli | ..................... | 370/410 |
| 2005/0234915 A1 * | 10/2005 | Ricciulli | ..................... | 707/10 |

OTHER PUBLICATIONS

Cho, Young H. et al. Programmable Hardware for Deep Packet Filtering on a Large Signature Set. Oct. 9, 2004. Workshop on Architectural Support for Security and Anti-virus. p. 1-9.*
Cho, Young H. et al. Deep Packet Filter with Dedicated Logic and Read Only Memories. 2004. Proceedings of the 12th Annual IEEE Symposium on Field-Programmable Custom Computer Machines. p. 1-10.*
Y.H. Cho, S. Navab, and W. H. Mangione-Smith, "Specialized Hardware for Deep Network Packet Filtering," *12th Conference on Field Programmable Logic and Applications*, pp. 452-461, Montpellier, France, Sep. 2002.

* cited by examiner

*Primary Examiner*—Christian LaForgia
(74) *Attorney, Agent, or Firm*—Christie, Parker & Hale, LLP.

(57) ABSTRACT

An improved deep packet filter system designed to optimize search of dynamic patterns for a high speed network traffic. The improved deep packet filter system is a hardware-based system with optimized logic area. One optimization technique is the sharing of common sub-logic in the hardware design to reduce the number of gates that are required. Another optimization technique is the use of a built-in memory to store portions of the pattern set, also resulting in a reduction of gates. The reduction of the logic area allows the deep packet filter system to be implemented onto a single field-programmable array chip.

21 Claims, 11 Drawing Sheets

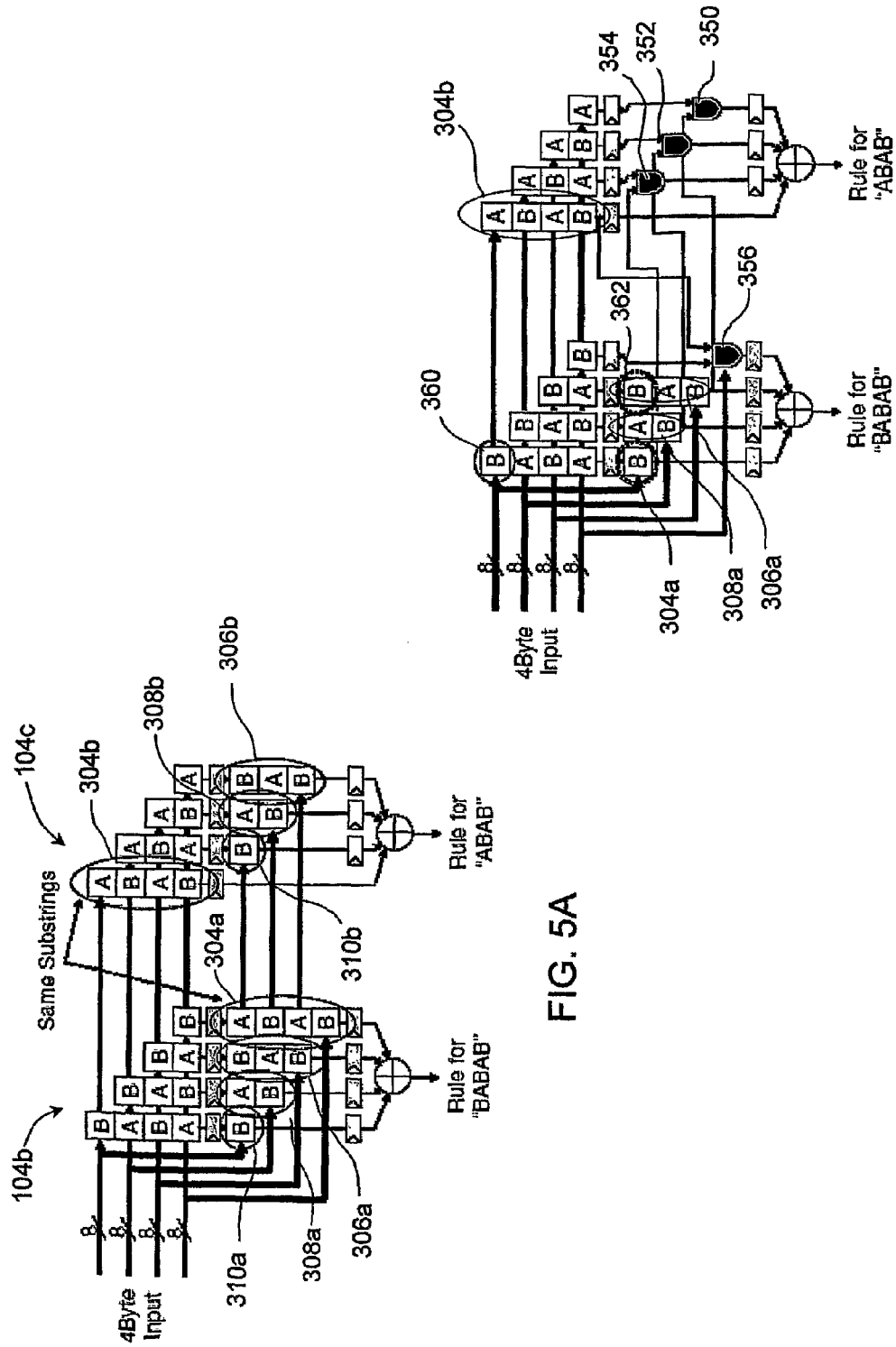

PROGRAMMABLE HARDWARE FOR DEEP PACKET FILTERING

CROSS-REFERENCE TO RELATED APPLICATION

This application is a National Phase Application of International Application No. PCT/US2005/013629, filed Apr. 19, 2005 which claims priority to U.S. application No. 60/563,435 filed Apr. 19, 2004.

STATEMENT REGARDING FEDERALLY SPONSORED RESEARCH/DEVELOPMENT

This invention was made with Government support under Grant No. 0220100, awarded by the National Science Foundation (NSF). The Government has certain rights in this invention.

BACKGROUND OF THE INVENTION

Flourishing network viruses indicate that traditional firewalls that inspect the network packet header alone may not be sufficient to protect computers from intrusion. Many of the new attacks are hidden in a payload portion of the packet in various dynamic locations, and not in the static header portion. For example, many recent worms found in the Internet are application-level attacks that are embedded in the packet payload at an unknown location. The packet header for such attacks may not indicate that the packet is illegitimate, and in fact, may appear as a legitimate packet. It is therefore desirable to have a security system that incorporates a deep packet inspection unit, also referred to as a multi-layer inspection unit, that not only examines the static packet header, but also looks through the entire payload to search for pre-defined patterns.

FIG. 1 is a block diagram of a typical multi-layer inspection system. The system includes a multi-layer inspection unit 10 that tales an incoming packet 20 and inspects layers 3-7 of the packet against all packet filter patterns 30. If any one of the patterns 30 match the information in layers 3-7, the packet is not allowed to pass. Otherwise, the packet is allowed to pass.

The multilayer inspection unit 20 may be embodied as one or more general purpose processors running a rule-based packet filtering software. However, due to an exhaustive pattern detection algorithm used by the software system, it is often difficult for the software to filter high speed network traffic of 1 Gbps or more. Specifically, because the location of the pattern is not predetermined, the patterns must be compared starting from every byte alignment of the payload during the search process. Thus, rule-based packet filtering software is not practical for use with such high speed networks.

There exists in the prior art custom hardware chips that support a faster network. Although these are efficient for use as packet classifiers based on searches of the static fields of a packet, they are poor candidates for dynamic pattern searches required for a deep packet filter. This is mainly due to the underlying sequential algorithm running on a Von Neuman architecture which eventually leads to performance bottleneck as the number of necessary pattern checks increase.

Accordingly, what is desired is an improved deep packet filter system for high speed networks.

SUMMARY OF THE INVENTION

The present invention is directed to a deep packet filter that includes a prefix search logic configured to compare a first non-header portion of incoming data against a prefix pattern. The filter also includes a memory storing a plurality of suffix patterns, and an address encoder generating a suffix index based on a match of the first non-header portion of the incoming data to the prefix pattern. The filter further includes comparator logic configured to compare a second non-header portion of the incoming data against a suffix pattern identified based on the generated suffix index. The incoming data is allowed to pass or not, based on the comparison of the second non-header portion.

According to one embodiment, the prefix search logic concurrently compares the first non-header portion of the incoming data against a plurality of prefix patterns. This may be done by concurrently comparing a plurality of bytes of the first non-header portion of the incoming data against a plurality of bytes of each of the plurality of prefix patterns.

According to one embodiment, the prefix search logic concurrently compares a plurality of bytes of the first non-header portion of the incoming data against different byte alignments for each of the plurality of prefix patterns.

According to one embodiment, the prefix search logic includes a chain of decoders for detecting a particular substring of the prefix pattern. For optimization purposes, the chain of decoders for detecting the particular substring may be shared by a plurality of prefix search logic units configured to detect different prefix patterns that include the particular substring.

According to one embodiment, the prefix search logic, memory, means for generating the suffix index, and the comparator logic are all implemented on a single field-programmable gate array.

According to one embodiment, the memory stores a list of sorted suffix patterns, wherein patterns in even entries of the list are stored from a first entry of the memory to a last entry, and patterns in odd entries of the list are stored from the last entry of the memory to the first entry.

According to one embodiment, the address encoder generates each bit of the suffix index based on a logic equation derived from a binary tree of OR gates coupled to an output of the prefix search logic.

According to one embodiment, the prefix search logic indicates a byte alignment, and the comparator logic includes a shifter for shifting the second non-header portion of the incoming data according to the indicated byte alignment.

According to one embodiment, the first and second non-header portions of the incoming data are payload portions of the data.

According to another embodiment, the present invention is directed to a deep packet filtering method that includes partitioning a plurality of patterns into a prefix portion and a suffix portion; storing the suffix portion of each of the plurality of patterns in a memory; concurrently comparing at least a portion of a first non-header portion of incoming data against at least a portion of the prefix portion of each of the plurality of patterns; generating a suffix index based on a match of the first non-header portion of the incoming data to a prefix portion of a particular pattern; identifying a suffix portion of the particular pattern stored in the memory based on the suffix index; comparing a second non-header portion of the incoming data against the identified suffix portion; and forwarding the incoming data or not, based on the comparison of the second non-header portion to the identified suffix portion.

These and other features, aspects and advantages of the present invention will be more fully understood when considered with respect to the following detailed description,

BRIEF DESCRIPTION OF THE DRAWINGS

FIG. 5A illustrates two decoder-based pattern search engines respectively configured to check for patterns "BABAB" and "ABAB" at different byte alignments according to one embodiment of the invention;

FIG. 5B illustrates the substring comparator sets of FIG. 5A, but with the duplicate sets removed;

DETAILED DESCRIPTION

The present invention is directed to an improved deep packet filter system designed to optimize search of dynamic patterns for high speed network traffic, such as, for example, network traffic of 1 Gbps or more. According to one embodiment, the improved deep packet filter system is implemented via hardware. One challenge in the design of such a hardware-based system is that a large number logic resources are generally needed to support a large pattern set. Such a pattern set may be provided, for example, by an open source network intrusion detection system commonly known as Snort.

According to one embodiment, the improved system reduces the required logic area of the hardware by applying a number of optimization techniques. One optimization technique is the sharing of common sub-logic in the hardware design to reduce the number of gates that are used. Another optimization technique is use of a built-in memory to store portions of the pattern set which also result in a reduction of gates.

The reduction of the logic area allows the deep packet filter system to be implemented with a single chip. Because the pattern set for intrusion detection is constantly updated with the surfacing of new viruses and worms, it is desirable for the chip that is used to be quickly and easily re-programmed. Accordingly, in one embodiment of the invention, the chip that is used is a single field programmable gate array (FPGA). A person of skill in the art should recognize, however, that the present invention is not limited to FPGAs, and another similar chips that allow quick and easy re-programming may also be used.

Figure 1:
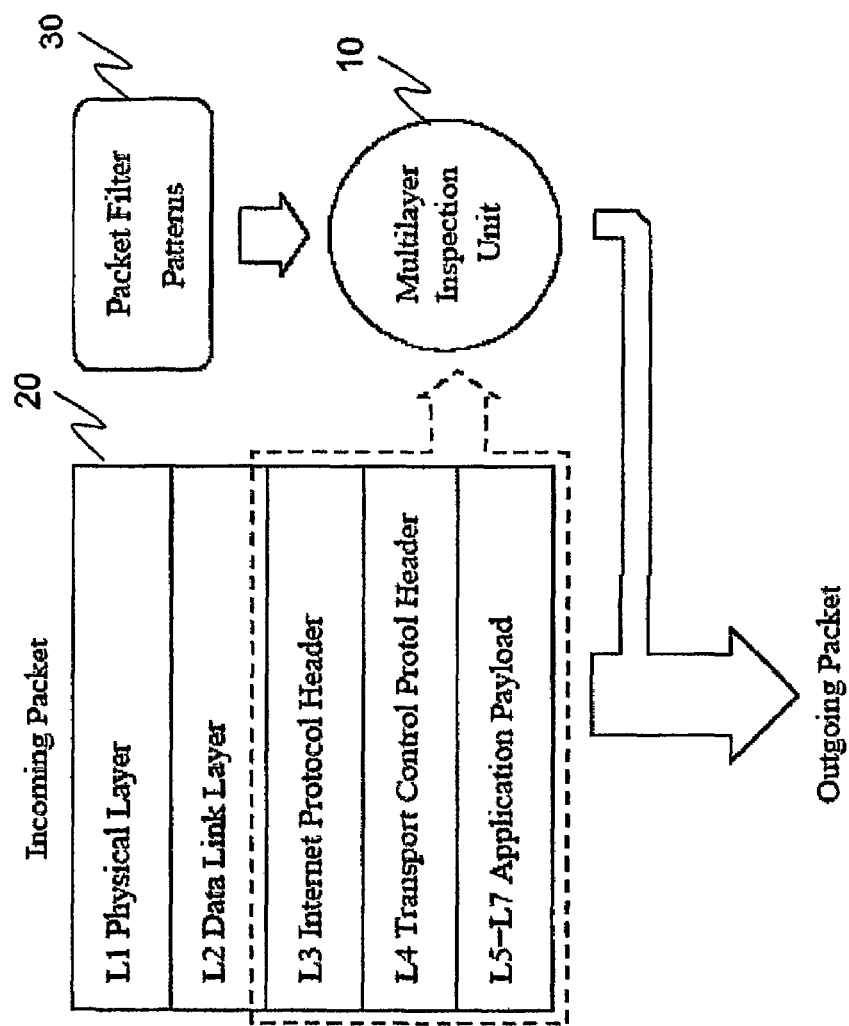
FIG. 1 is a block diagram of a typical multi-layer inspection system.
Figure 2:
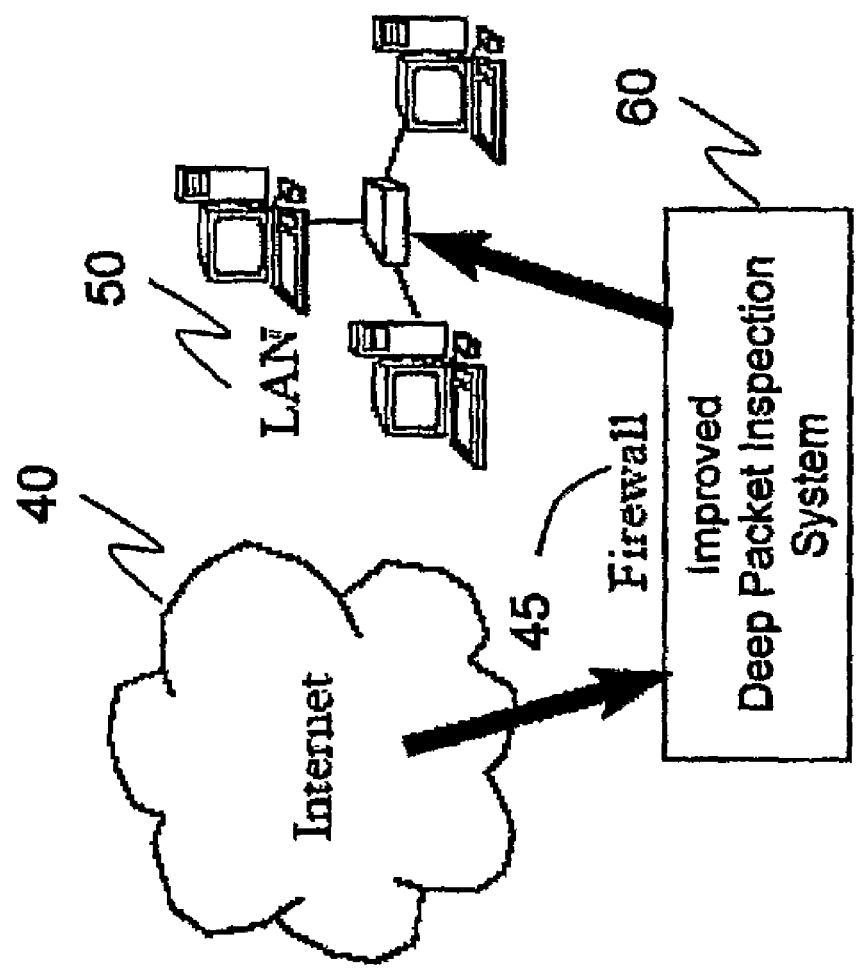
FIG. 2 depicts a network in which an improved deep packet filter system is employed according to exemplary embodiments of the present invention.

FIG. 2 depicts a network in which an improved deep packet filter system is employed according to exemplary embodiments of the present invention. In the illustrated network, a packet is transmitted via an untrusted medium 40, such as, for example, the Internet, and received and examined by a firewall 45 configured to protect a network of devices 50, such as, for example, devices in a local area network, from intrusion. According to one embodiment, the firewall is equipped with an improved deep packet inspection system 60 that not only examines the header of the packet, but also inspects the payload portion for determining whether the packet should be dropped or allowed to pass. According to one embodiment, the firewall may also be equipped with other conventional intrusion detection and prevention mechanisms for complementing the improved deep packet inspection system 60.

In one embodiment of the invention, the improved deep packet inspection system may also be incorporated in a high-speed router or switch. By incorporating the system in such a router or switch, many of known application-level attacks may be filtered out.

Figure 3:
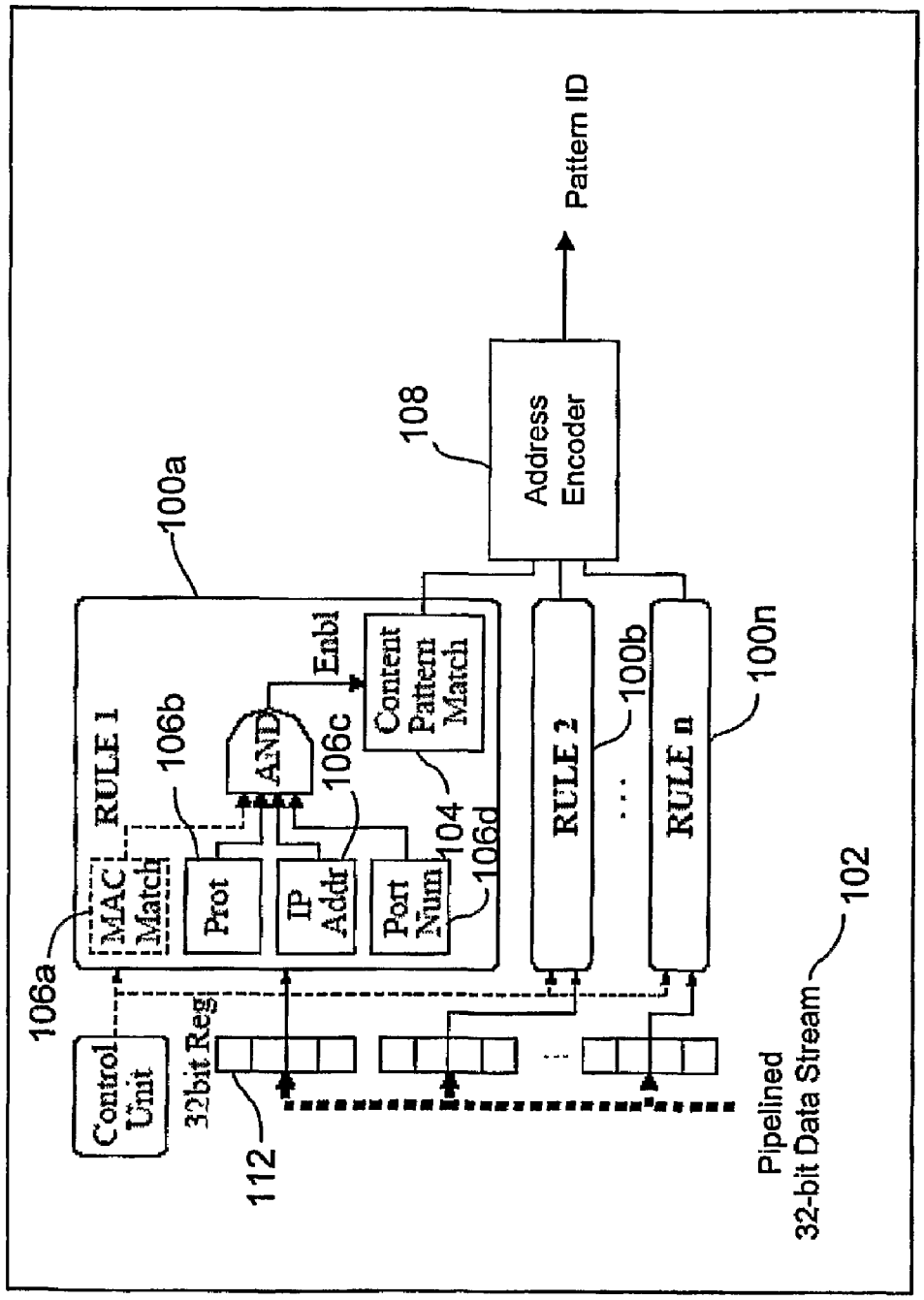
FIG. 3 is a schematic block diagram of the improved deep packet filter system of FIG. 1 according to one embodiment of the invention.

FIG. 3 is a schematic block diagram of the improved deep packet filter system 60 according to one embodiment of the invention. The illustrated deep packet filter system is composed of various inspection modules 100a-100n (collectively referred to as 100) which are connected in parallel. In this manner, each inspection module concurrently compares a portion of the incoming data against a given set of target patterns (also referred to as rules or signatures), at each clock cycle. According to one embodiment, each inspection module includes logic for implementing a single Snort rule signature.

Incoming packet data 102 is passed to a 32-bit register 112 via a 32-bit bus 100. The data stored in the register is then concurrently forwarded to the inspection modules 100a-100n for a match.

According to one embodiment of the invention, each inspection module 100 is configured with a dynamic pattern search engine 104 that compares the payload portion of the incoming data against a specific rule pattern, and provides its result to an address encoder 108. According to one embodiment of the invention, the search engine 104 includes various parallel pipelined series of reconfigurable discrete logic.

The address encoder 108 receives a match indication from each of the inspection modules and outputs a pattern ID indicative of a detected pattern. Alternatively, the address encoder 108 may be replaced with an OR gate that simply indicates whether a match has been made. A match indication may then be used to alert the user and/or drop the incoming packet.

The dynamic pattern search engine 104 may also work together with one or more static header detectors 106a-106d that search the static header portions of the incoming data 102 for specific types of header information. Based on the detected header information, deep packet inspection by the dynamic pattern search engine 104 may be enabled or not. For example, the static header detectors may search for specific physical addresses, protocols, IP addresses, port numbers, and the like.

Figure 4:
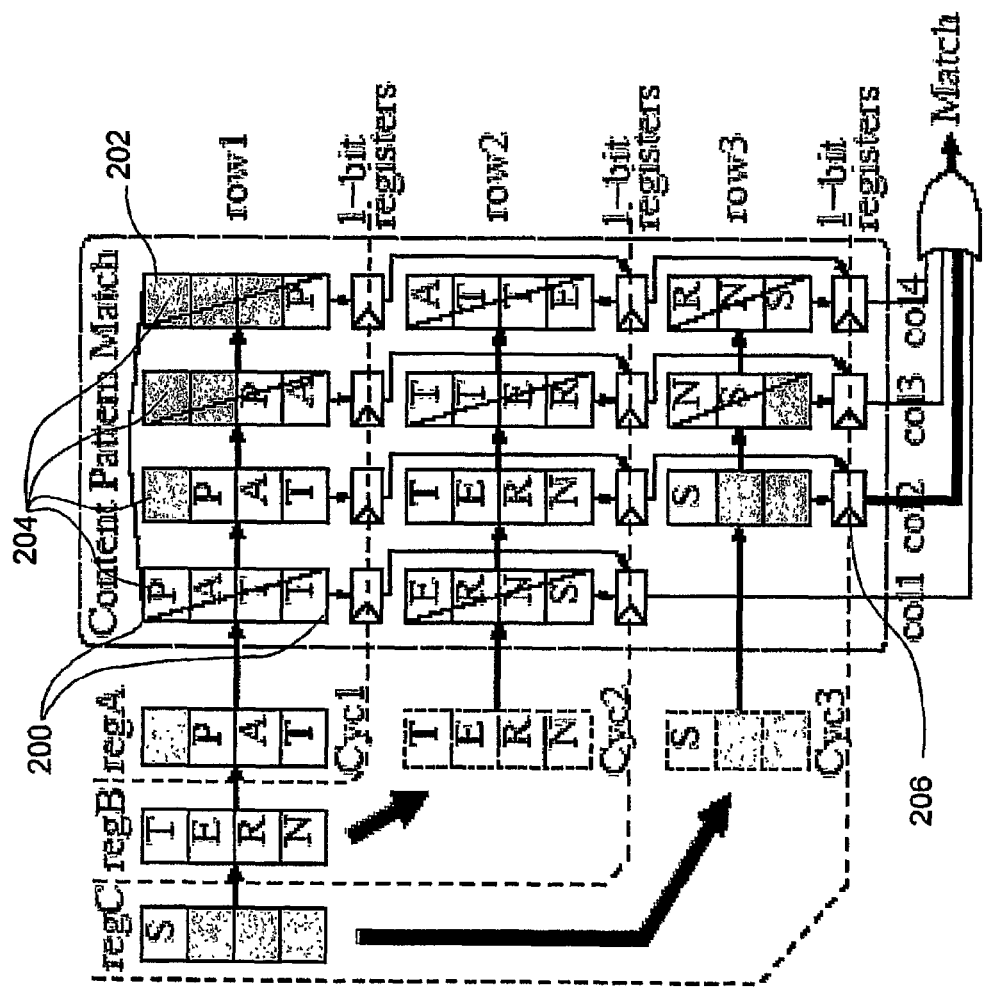
FIG. 4 is an operational diagram of a decoder-based pattern search engine according to one embodiment of the invention.

According to one embodiment of the invention, the dynamic pattern search engine 104 is implemented as a pipelined chain of decoders configured to search for particular patterns at different byte offsets. FIG. 4 is an operational diagram of a decoder-based pattern search engine 104a according to one embodiment of the invention. The search engine 104a includes pipelined chains of substring comparators 200 that compare the incoming data against a particular signature. Because reconfigurable logic is used according to one embodiment, each individual comparator 202 may be implemented with an 8-to-1 decoder that detects one byte of data.

The illustrated decoder-based pattern search engine is configured to search for the string "PATTERNS." In the illustrated example, four bytes of data are matched in each stage/chain of the pipeline to increase its throughput. Due to the datapath that provides multiple bytes of input data, the same data must be examined at different byte alignments of the bus. Thus, four different sets of substring comparators 204 are used in each pipeline stage to concurrently inspect all the different byte offsets of a 4-byte incoming data. Each match result is then passed to a 1-bit register 206 that is coupled to each set of substring comparators 200.

In the illustrated example, each 8-bit register making up the 32-bit register 112 stores an ASCII character of the incoming data stream. Register A illustrates the incoming data during a first clock cycle, register B illustrates the incoming data during a second clock cycle, and register C illustrates the incoming data during a third clock cycle. Together, the content of the pipelined registers A, B, and C represent the string stream "PATTERNS."

During the first cycle of the illustrated example, substring "PAT" is compared against four different substrings having different byte offsets in row 1. Because all of the 1-bit registers 202 are initialized as 0, the result is not latched even if there is a matching pattern in rows 2 and 3. In this example, a set of comparators 200a in row 1, column 2, that match the substring "PAT," cause a result value of "1." This value is latched through a corresponding 1-bit register 202a to enable a next row of 1-bit registers.

During the second cycle, the substring in register B is latched into register A. The substring is then compared against all the pattern subsets. However, the only comparator results that may be latched are all the comparators in row 1 and a set of comparators 200b in row 2, column 2. It is desirable to enable all the row 1 registers because of a possibility that the pattern may have actually started with the content in register B during the first cycle. The matching pattern in the set of comparators 200b generates a value of "1" which is latched through a corresponding 1-bit register 202b to enable a next row of 1-bit registers.

During the third cycle, the substring in register C is latched into register A. The matching pattern configured in a set of comparators 200c in row 3, column 2 sends a value of "1" to the address encoder 108.

As discussed above, one of the challenges in the design of a hardware-based deep packet filter system is that it requires a large number of logic resources. For example, in order to implement 2,207 signatures in the Snort rule set, over 12 of the largest FPGAs would be typically required. Thus, according to one embodiment of the invention, various optimization techniques are used to allow the deep packet filter system 60 to be implemented onto a single FPGA. One such optimization technique is to design a decoder-based pattern search engine 104a that allows the sharing of substring comparators. Referring again to the design illustrated in FIG. 4, all sets of substring comparators for the same byte alignment are connected to the same input pins. Some of these substring comparators check for the same substring. Accordingly, duplicate sets of substring comparators may be safely removed without losing design functionality.

According to one embodiment, one of the first steps for eliminating duplicate sets of substring comparators is to divide every target string into a set of 1 to 4-byte segments. Then, a set of unique segments is extracted from the original set. All the unique string segments are translated into unique sets of substring comparators. Finally, the outputs of the substring comparators are forwarded to the corresponding dynamic pattern search engines 104.

FIG. 5A illustrates two decoder-based pattern search engines 104b, 104c respectively configured to check for patterns "BABAB" and "ABAB" at different byte alignments according to one embodiment of the invention. Only the relevant 8-bit comparators in each set of substring comparators are illustrated for sake of simplicity.

In the illustrated example, there are four pairs of duplicate substring comparator sets: substring comparator sets 304a, 304b checking for the substring "ABAB;" substring comparator sets 306a, 306b checking for the substring "BAB;" substring comparator sets 308a, 308b checking for the substring "AB;" and substring comparator sets 310a, 310b checking for the substring "B." Because each pair of duplicate substring comparator sets for the same byte alignment are connected to the same data input pins, one substring comparator set from each pair may be safely removed and replaced with an AND gate.

FIG. 5B illustrates the substring comparator sets of FIG. 5A, but with the duplicate sets removed. In the illustrated example, substring comparator set 304a is replaced with AND gate 356 which receives as an input, an output from substring comparator set 304b; substring comparator set 310b is replaced with AND gate 354 which receives as an input, an output from substring comparator set 304a; substring comparator set 308b is replaced with AND gate 352 which receives as an input, an output from substring comparator set 308a; and substring comparator set 306b is replaced with AND gate 350 which receives as an input, an output from substring comparator set 306a.

According to one embodiment of the invention, another optimization technique used to reduce the logic area of the decoder-based pattern search engine is to design the engine so as to allow it to share individual comparators in the same byte alignment. For example, in the decoder-based pattern search engines 104b, 104c of FIG. 5B, the output of a "B" comparator 360 in a first pipeline stage that receives input from a particular input pin may be reused for two other comparators 304a, 362 in a second pipeline stage that also receive input from the same input pin. In this regard, the redundant comparators 304a, 362 are replaced with AND gates which receive as their input, an output from the "B" comparator 360. After eliminating all duplicates in the example search engines 104b, 104c illustrated in FIG. 5B, a functionally equivalent design may be obtained with only eight 8-bit comparators, where each 8-bit comparator is composed of two 4-bit, reconfigurable look-up tables. Thus, in this example, the total logic requirement is reduced by 25%.

Figure 6B:
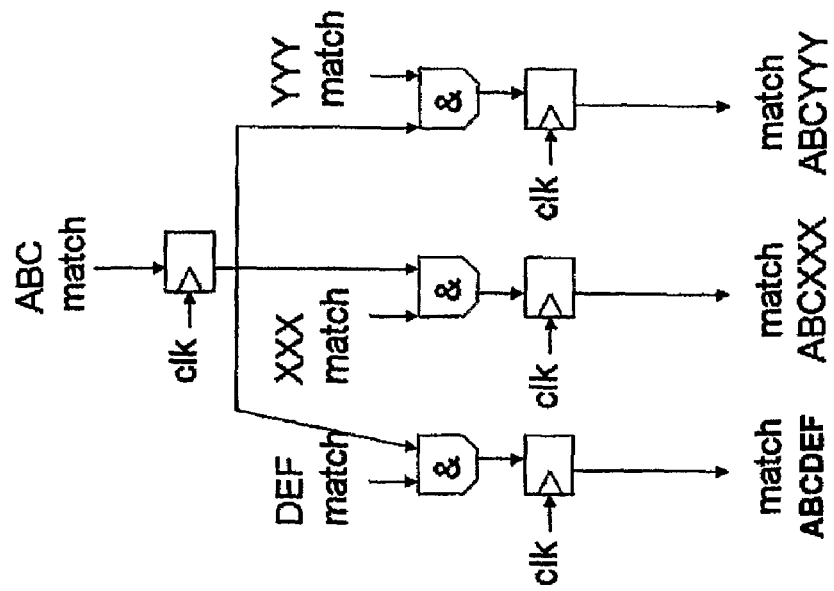
FIG. 6B illustrates a collapsed pipelined chain of comparators for searching for patterns "ABCDEF," "ABCXXX," and "ABCYYY."
Figure 6A:
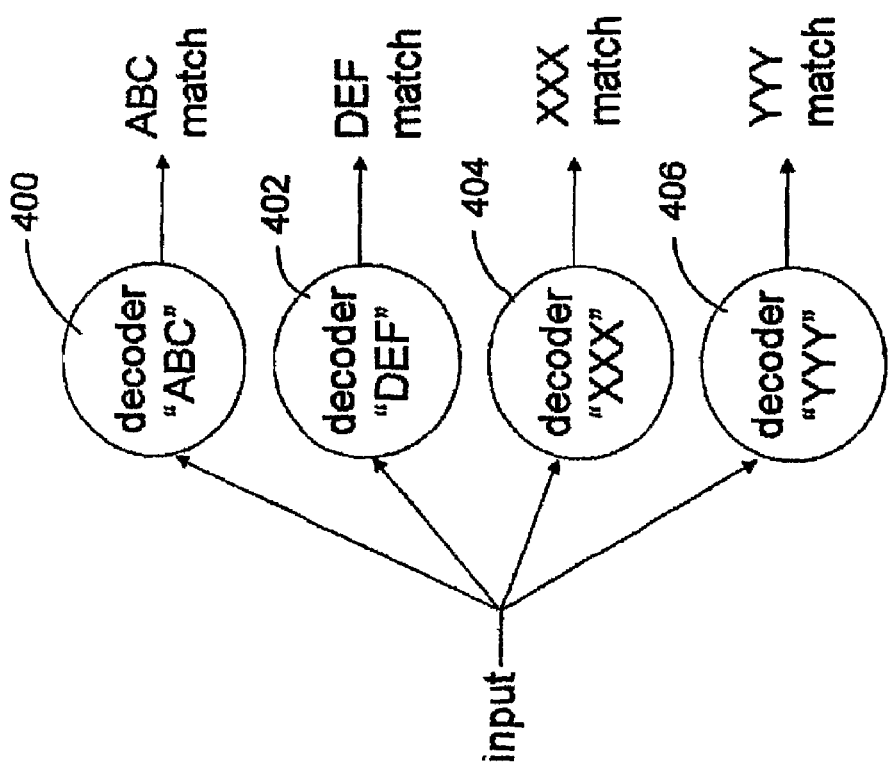
FIG. 6A illustrates substring comparator sets for searching for patterns "ABCDEF," "ABCXXX," and "ABCYYY" that remove duplicate comparators according to one embodiment of the invention.

According to one embodiment of the invention, another optimization technique for reducing the logic area of the improved deep packet filter system 60 is the use of a keyword tree for the pattern search engine 104 that allows pipeline chains to be combined. For example, if the patterns that are to be searched are "ABCDEF," "ABCXXX," and "ABCYYY," substring comparators may be used in a manner that eliminates duplicates as is illustrated in FIG. 6A. In the illustrated example, substring comparator 400 detects the substring "ABC," substring comparator 402 detects the substring "DEF," substring comparator 404 detects the substring "XXX," and substring comparator 406 detects the substring "YYY." The output of each substring comparator is then used to generate three pipelined chains with AND gates. According to one embodiment, the chain is collapsed to reduce the resources for the chains as is illustrated in FIG. 6B. The conversion not only reduces the amount of required storage, but it also narrows the number of potential patterns as the program traverses down the tree. According to one embodiment, constructing the trees in a parallel design as is illustrated in the embodiment of FIGS. 4-5 requires that the length of the comparators 400-406 be in multiples of the datapath width.

The inspection modules 100a-110n in the embodiment of FIG. 3 generate a 1-bit output to indicate whether a match has occurred at that clock cycle. In the scenario where 1519 unique inspection modules are used to represent a rule set, the output of the inspection modules are 1519 bits. It may be sufficient in some applications to simply OR all these bits to indicate a match, with the identification of the pattern that was matched to be accomplished in software. However, it is often more desirable to produce an index number of the pattern that was matched via hardware.

One challenge in generating the index number is that the index number is often generated from a fairly large input, such as, for example, 1519 bits. Another challenge is that more than one inspection module may indicate a match during the same clock cycle.

According to one embodiment of the invention, the address encoder 108 takes the 1519 bits produced by the inspection modules and generates an 11-bit index number of the pattern that was matched, using a combination of outputs from a binary tree of OR gates provided by the address encoder 108. FIG. 7A illustrates an exemplary binary tree of OR gates 500 according to an exemplary embodiment that encodes a 15-bit input 502 into a 4-bit index. Based on the natural characteristic of the binary tree, a determination may be made that each index bit of the index should be asserted if any of the odd nodes on a corresponding level of the tree is asserted. Thus, if an assumption is made that only one input pin will be asserted at any clock cycle (i.e. only one pattern is detected at each cycle), a 4-bit index encoder for a 15-bit input may be generated according to the following index bit equations (1)-(4):

$$\text{Index3} = a1 \quad (1)$$

$$\text{Index2} = b1 + b3 \quad (2)$$

$$\text{Index1} = c1 + c3 + c5 + c7 \quad (3)$$

$$\text{Index0} = d1 + d3 + d5 + d7 + d9 + d11 + d13 + d15 \quad (4)$$

Thus, in generating the 4-bit index encoder, logic may be used for combining the inputs of the various nodes of the binary tree as indicated by the equations. For example, the logic for generating bit 0 of the index includes a plurality of OR gates that take the outputs of the odd-numbered input pins at tree level D. The logic for generating bit 1 of the index includes a plurality of OR gates that take the outputs of the odd-numbered nodes on tree level C, and so on. A 1-bit register at the output of the logic for each index bit stores the encoded index bit.

As discussed above, the address encoder generated according to equations (1)-(4) is a simple encoder that assumes no more than one input pin will be asserted at a particular clock cycle. However, if more than one input pin is asserted, a simple address encoder may not be sufficient to appropriately indicate a pattern index. One solution to the conflict is to divide the rule set into multiple subsets, each subset containing non-overlapping patterns. A Simple address encoder may then be provided for each sub-set pattern search unit. In some cases, however, limited output pin count may make it infeasible to have a multiple index output. Therefore, in such a case, it may be desirable to designate a priority to the pattern index.

According to one embodiment of the invention, software pre-processing is used to assign priorities to the index numbers. According to another embodiment, hardware is directly modified to assign the index priorities.

According to the software-preprocessing method, all the patterns that can assert encoder inputs at the same time are assigned index numbers according to equation 5:

$$In|In-1|\ldots|I0 = In \quad (5)$$

Equation 5 applies a bit-wise OR to all the indices of the overlapping patterns where In is an index number with a higher value of n, the higher value of n indicating a higher priority. Once all the indices are assigned to the overlapping patterns according to the desired priorities, indices may then be assigned to the rest of the patterns.

The mechanism for assigning index priorities according to the software-preprocessing embodiment places a limitation on the size of the prioritized pattern set. The maximum number of indices for each set is equal to the number of index output pins. There may be several independent sets of overlapping patterns in a realistic configuration, but their number of simultaneously overlapping patterns are usually less than four. Therefore, for most sets, this technique is sufficient. The advantage of using the software-preprocessing mechanism is that no additional gates are needed.

For situations where strict priorities are needed, a hardware-based priority index encoder may be used to construct priority-based indices using additional gates for the address encoder. According to this hardware-based priority encoder, a higher index signifies a higher priority.

The hardware-based priority encoder may be designed based on the following examination of the binary OR tree of FIG. 7A. In the illustrated binary OR tree, the most significant index bit is "1" if any of the 15-bit inputs 502 (D nodes) under a A1 node 504 is asserted. Since the higher numbered D nodes have the priority over the lower, the output of a A0 node 512 need not be considered. Thus, the hardware-based priority encoder assigns the most significant bit value of the index to be the output of A1.

For the next index bit, branches with nodes that are immediate children of the A1 and A0 nodes 504, 512 are considered. This leads to the deduction that the second index bit is "1" if the output of a B3 node 508 is asserted. However, the second index bit is also "1" if the output of a B1 node 506 is "1" while no higher flags are "1." In the illustrated binary OR tree, we only need to check that the A1 node 504 is "0" to verify that none of its children nodes constituting the higher flags are asserted. Subsequent address/index bits may be constructed using this deductive procedure. Thus, a 4-bit priority index encoder may be generated for a 15-bit input according to the following index bit equations (6)-(9).

$$\text{Index}_3 = a_1 \tag{6}$$

$$\text{Index}_2 = b_1 \cdot \overline{a_1} + b_3 \tag{7}$$

$$\text{Index}_1 = c_1 \cdot \overline{b_1} \cdot \overline{a_1} + c_3 \cdot \overline{a_1} + c_5 \cdot \overline{b_3} + c_7 \tag{8}$$

$$\text{Index}_0 = d_1 \cdot \overline{c_1} \cdot \overline{b_1} \cdot \overline{a_1} + d_3 \cdot \overline{b_1} \cdot \overline{a_1} + d_5 \cdot \overline{c_3} \cdot \overline{a_1} + d_7 \cdot \overline{a_1} + d_9 \cdot \overline{c_5} \cdot \overline{b_3} + d_{11} \cdot \overline{b_3} d_{13} \cdot \overline{c_7} + d_{15} \tag{9}$$

Thus, in generating the hardware-based priority encoder, additional logic is used to combine the inputs of the various nodes of the binary tree as indicated by the equations. For example, the logic for generating bit 2 of the priority index according to equation (7), unlike the logic of the simple encoder according to equation (2), adds additional logic for verifying that the A1 node 504 is "0."

According to one embodiment of the invention, in order to minimize resources for the address encoder, nodes of the OR tree that are not used by any of the equations are deleted. Thus, in the example illustrated in FIG. 7A, all nodes on the left edge of the tree 510, 512, 514, 516, and 518 may be pruned off staring with a main root node 510. With registers at the output encoded address bits, the critical path has a maximum of (log n)–1 gate delays where n is the number of the input pins. Since pattern search structures are pipelined after every gate, such a long chain of gates become the critical path. Each look-up-table in most FPGAs are usually paired with a D-flip flop. Thus, the hardware design of the encoder may insert additional pipeline registers.

Figure 7B:
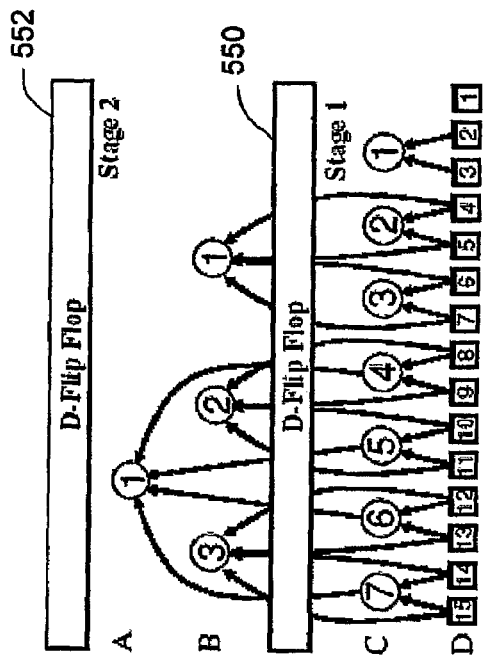
FIG. 7B illustrates a pipelined OR tree with most 2-two input gates replaced by a 1-four input gate followed by a D-flip flop according to one embodiment of the invention.
Figure 7A:
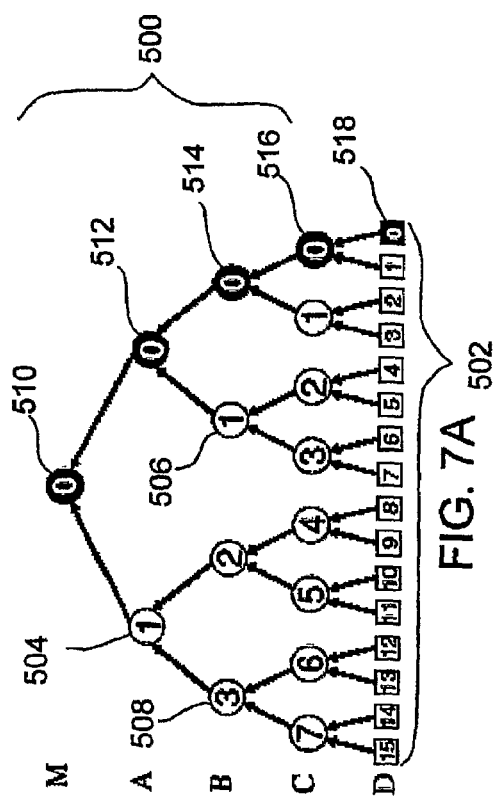
FIG. 7A illustrates an exemplary binary tree of OR gates that encodes a 15-bit input into a 4-bit index according to one embodiment of the invention.

FIG. 7B illustrates a pipelined OR tree with most 2-two input gates replaced by a 1-four input gate followed by a D-flip flop. The logic for implementing the index equations are also further pipelined to maintain a single gate level in-between pipelined registers.

According to another embodiment of the invention, the logic area for implementing the improved deep packet filter system 60 is reduced by implementing the pattern search engine 104 as a memory-based pattern search engine that makes use of a built-in memory, such as, for example, a read-only memory (ROM) included in an FPGA chip.

Figure 8:
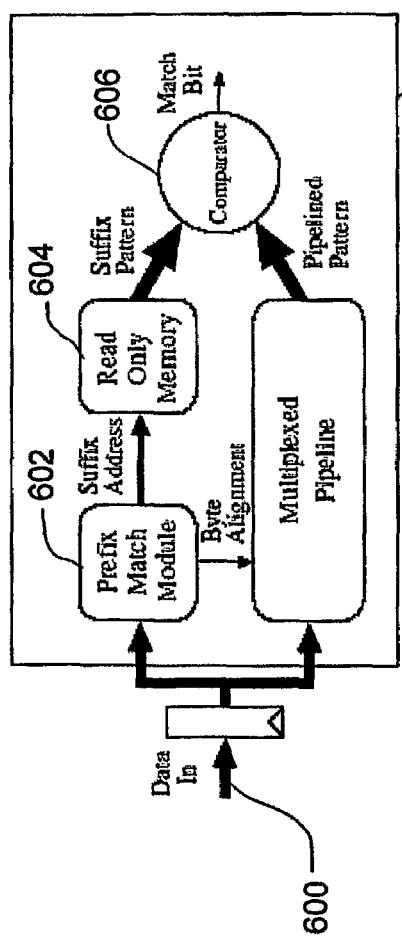
FIG. 8 is a block diagram of a memory-based pattern search engine according to one embodiment of the invention.
Figure 9:
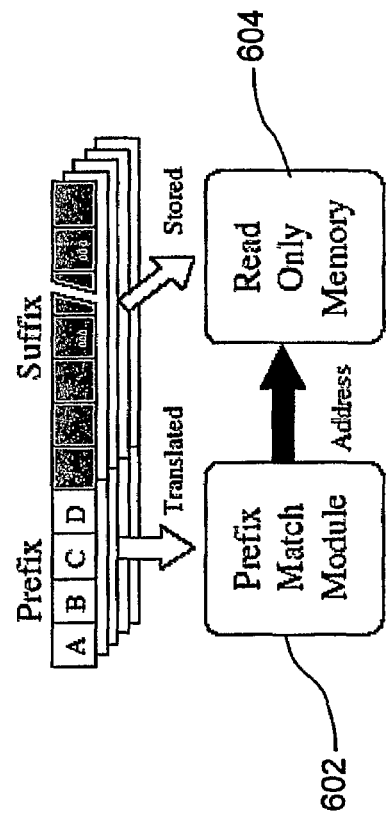
FIG. 9 illustrates incoming data divided into a prefix portion and a suffix portion, where the prefix portion is matched by a prefix search engine to generate an address in a read only memory that stores a corresponding suffix portion of the incoming data.

FIG. 8 is a block diagram of a memory-based pattern search engine 104d according to one embodiment of the invention. As illustrated in FIG. 8, a beginning portion of incoming data 600, hereinafter referred to as a prefix, is pre-screened by a prefix search engine 602 before invoking a complete comparison with the rest of the data, hereinafter referred to as a suffix. The prefix search engine 602 matches the prefix portion with a set of predefined prefix patterns. For a datapath with a multiple byte input, the prefix search engine 602 also generates alignment information of the matching prefix. An index of the matching prefix pattern is then directly mapped to an address of a built-in memory 604 where different suffix patterns are stored, as is illustrated in FIG. 9. The incoming data and suffix are compared by a comparator 606 module at a corresponding alignment to determine whether an exact match has occurred.

In order for the memory-based design to function correctly, the patterns in the rule set are partitioned and mapped into one or more ROMs. According to one embodiment of the invention, the patterns are partitioned so that the prefixes in each partition are unique. In this regard, for different length prefixes, the patters are partitioned so that tail end of longer prefixes in the partition do not match the shorter prefixes. Otherwise, more than one prefix match can occur. If there is more than one prefix detection, the prefix search engine 602 may not determine which suffix to read from the memory.

The prefix width may be of any size. However, according to one embodiment of the invention, the prefix is set to be equal to the width of the input bus, such as, for example, four bytes. Since every clock can potentially produce a valid index for retrieving a suffix, a suffix comparison is done at most once per cycle. Thus, any prefixes that can produce two different alignments are assigned to separate ROMs. For a datapath with one byte-input, this constraint does not cause any problems, since the data is always at zero alignment. However, certain prefixes can match two different alignments if the datapath provides a multiple-byte input.

For instance, assume that in a 4-byte datapath, the prefix search engine 602 is configured with a prefix "ABAB." If the incoming data 600 started with "ABAB," the alignment for the prefix could be either 0 or 2. This is because the second sub-string "AB" could be the actual starting point of the pattern. Therefore, depending on the datapath and the lengths of the prefixes, conditions are formed to test every pattern in the set to allow only up to one index detection at each cycle.

For a 4-byte datapath with fixed 4-byte prefixes, all prefixes in the partition are configured to meet the following three conditions: (1) byte 1 of the prefix does not equal to byte 4; (2) the substring from bytes 1 to 2 does not equal the substring from bytes 3 to 4; and (3) the substring from bytes 1 to 3 does not equal the substring from bytes 2 to 4.

Figure 10:
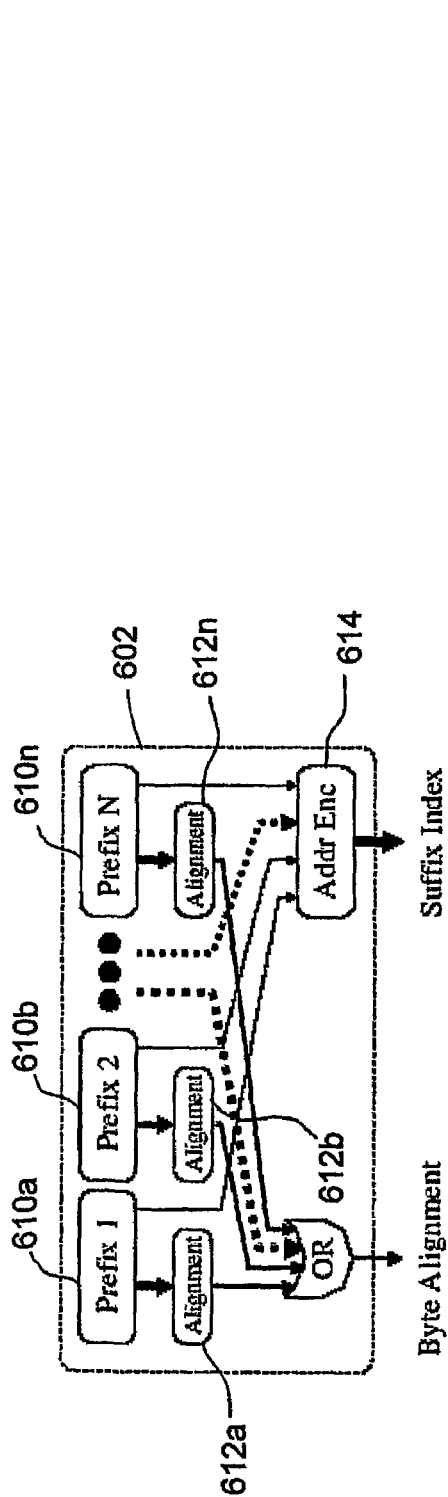
FIG. 10 is a more detailed block diagram of a prefix search engine included in the memory-based pattern search engine of FIG. 8 according to one embodiment of the invention.

FIG. 10 is a more detailed block diagram of the prefix search engine 602 included in the memory-based pattern search engine 104d according to one embodiment of the invention. The prefix search engine 602 includes a plurality of search modules 610a-610n which, according to one embodiment, are implemented as decoder-based pattern search engines illustrated in FIGS. 4-6. Each search module 610a-610n compares the prefix portion of the input data at different byte alignments of a predetermined prefix pattern. Alignment modules 612a-612n coupled to each search module 610a-610n indicate the alignment of the matching prefix pattern. Match signals from the various alignment modules 612a-612n are then encoded to provide the alignment information. Furthermore, an address encoder 614 generates a suffix index based on the match signals from the various search modules 610a-610n. The address encoder 614 may be, for example, similar to the address encoder 108 of FIG. 3. Because the prefixes are partitioned as described above, only one prefix in a given subset is detected at each clock cycle. Accordingly, the alignment and address encoding need not consider the priority of the matching patterns, and thus, the logic may be made simple and compact.

According to one embodiment of the invention, the memory 604 is built into the chip used to implement the improved deep packet filter system 60. For example, the memory 604 is a ROM provided in a FPGA chip. According to one embodiment, the width of the memory is fixed to be as wide as the longest suffix entry in the set. Due to the varying lengths of the suffixes, memory utilization having such fixed widths may be inefficient.

Figure 11:
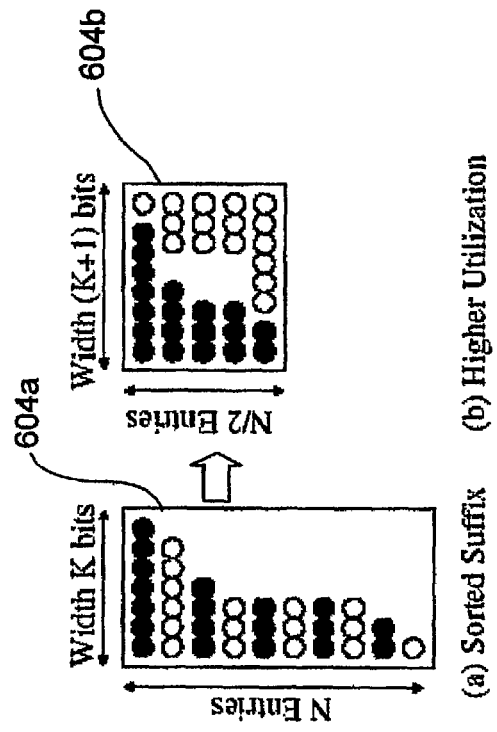
FIG. 11 illustrates a mechanism for improving memory utilization according to one embodiment of the invention.

FIG. 11 illustrates a mechanism for improving the memory utilization according to one embodiment of the invention. As illustrated in FIG. 11, memory 604a stores, in a sorted manner, N suffix entries of varying lengths. Utilization of the memory 604a, however, is inefficient because it leaves about half of the memory space left unused. According to one embodiment of the invention, more efficient use of the memory space is achieved by filling the unused space with valid data. In this regard, the suffix patterns to be stored are first sorted according to their length. Then, all the even entries are sequentially stored from the first entry of the memory to the last. Then, all the odd entries are flipped in terms of their bit sequences and stored from the last entry to the first as shown by the contents of memory 604b. This process effectively stores the odd entries into a transposed memory.

Figure 12:
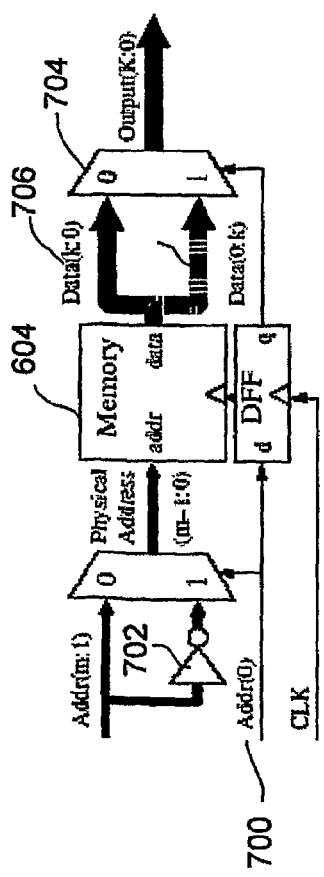
FIG. 12 is a schematic block diagram of wrapper logic for using with a memory of the memory-based pattern search engine of FIG. 8 according to one embodiment of the invention.

In order to correctly read the rearranged memory entries, a small amount of wrapper logic is used. FIG. 12 is a schematic block diagram of the wrapper logic according to one embodiment of the invention. At an address input of the memory, all the bits, except for the least significant bit (LSB) 700, are passed to the memory 604. The LSB 700 is used to determine whether the address is even or odd. If the address is even, the rest of the address bits are unchanged and passed on as a physical address. Otherwise, the address bits are first inverted via an inverter 702 and then passed on to the memory 604. Likewise, the output of the memory 604 is connected to a 2-to-1 multiplexor 704 with the LSB connected to its select pin. When the LSB indicates an even entry, the normal output 706 is selected. If an odd entry is indicated, the output with the reversed bit order 708 is selected.

Figure 13:
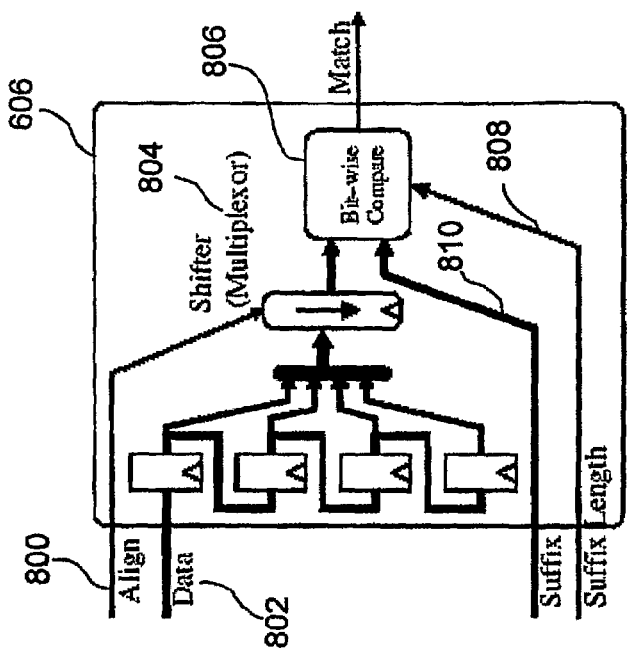
FIG. 13 is a schematic block diagram of a comparator module of the memory-based pattern search engine of FIG. 8 according to one embodiment of the invention.

FIG. 13 is a schematic block diagram of the comparator module 606 according to one embodiment of the invention. Once the suffix pattern is read from the memory 604, the incoming packet data 802 is pipelined and shifted to the appropriate byte alignment via a shifter 804 provided by the comparator module. The number of pipeline stages are determined based on the length of the longest pattern and ROM latencies.

The shifters may be implemented via a single level of multiplexors, or may be pipelined to multiple levels depending on the width of the input bus. A one byte datapath only has a single alignment, and thus, no shifters are necessary.

In addition to the suffix patterns, the memory 604 also stores the length of each pattern, and provides such length 808 to a bit-wise comparator 806. The length is decoded by the bit-wise comparator 806 to only enable the comparators of the indicated length. The bit-wise comparator 806 then compares the received suffix pattern 810 with the byte-aligned packet data. When the data matches the suffix pattern, the prefix index generated by the prefix search engine 602 used as the suffix memory address, is forwarded as an output to identify the detected pattern. The incoming data packet may also be dropped, and/or a user alerted of the suspicious packet.

According to one embodiment of the invention, the bit-wise comparators 806 are implemented as 1-byte XOR comparators. Unlike the decoders used in the decoder-based design of FIGS. 4-6 made of two look-up tables, the XOR comparators are made of eight look-up tables. However, since only one set of comparators is used by all the patterns stored in the ROM, the average gates per byte may be much less than a full decoder implementation.

Figure 14:
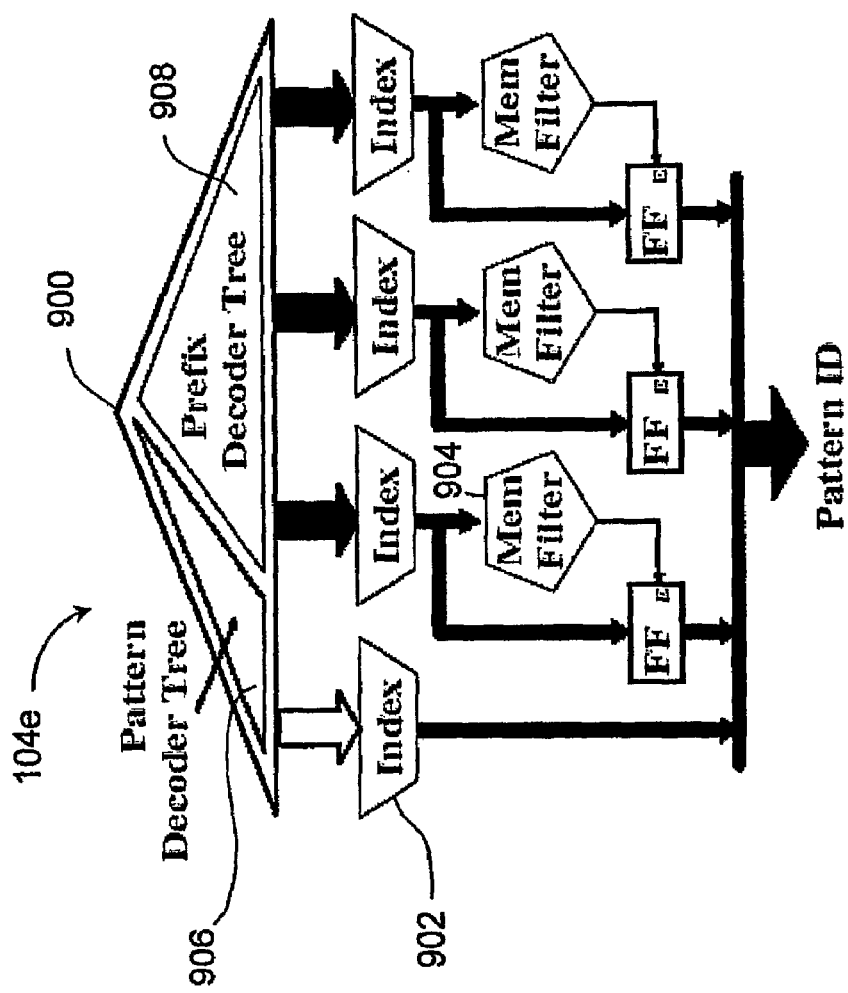
FIG. 14 is a block diagram of a pattern search engine combining both a decoder-based design of FIGS. 4-6 as well as a memory-based design of FIGS. 8-13 according to one embodiment of the invention.

According to one embodiment of the invention, the improved deep packet filter system 60 incorporates both the decoder-based design of FIGS. 4-6 as well as the memory-based design of FIGS. 8-13. FIG. 14 is a block diagram of a pattern search engine 104e combining both designs according to one embodiment of the invention. Because the prefixes for the patterns stored in the memory are essentially a set of shorter patterns, they may be combined with the rest of the patterns to yield an efficient keyword tree 900. For the shorter patterns, then, a decoder-based search engine 906 performs the comparison and transmits a match indication to an address encoder 902, which may be similar to the address encoder 108 of FIG. 3. The address encoder 902 then outputs a corresponding pattern ID.

For the longer patterns, a decoder-based search engine 908 performs a comparison of the prefix, and an output index is used to select a stored suffix in memory-based search engine 904. The index is then output as the corresponding pattern ID.

Since large amounts of patterns are stored in the memory, the combined design of FIG. 14 requires much less gates than the decoder-based filter. As a result, the full filter may be successfully placed and routed into a smaller Spartan 3-XC3S400 device. During experimentation, the system used a total of 4,415 look up tables with a clock rate of 200 Mhz in the XC3S400 device and at 237 Mhz in XC3S1000 device. The speed up in XC3S1000 device was due to higher degree of freedom in placing the components in the larger FPGA.

In the instances where pattern detection rate is low, it may be sufficient to indicate a match signal without identifying the pattern. Software may then do a thorough search of the database to determine which pattern was detected. For such a design all the index encoders 902 may be replaced with a tree of OR gates to reduce the amount of gates. Due to our efficient index encoder design, however, only 755 look up tables may be reclaimed from the decoder-based design and 65 look-up tables for the memory based implementation.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. For example, although the dynamic pattern search engine is described as searching a payload portion of a data packet, a person of skill in the art should recognize that the search engine may be configured to search other portions of the packet in addition or in lieu of the payload portion.

In view of the above it will be understood that the invention is not limited to the particular embodiments or arrangements disclosed, but is rather intended to cover any changes, adaptations or modifications which are within the scope and spirit of the invention as defined by the appended claims and their equivalents.

What is claimed is:

1. A deep packet filter comprising:
   prefix search logic configured to compare a first non-header portion of incoming data against a prefix pattern;
   memory coupled to the prefix search logic, the memory storing a plurality of suffix patterns;
   means for generating a suffix index based on a match of the first non-header portion of the incoming data to the prefix pattern; and
   comparator logic configured to compare a second non-header portion of the incoming data against a suffix pattern selected from the plurality of suffix patterns,
   wherein the suffix pattern is identified based on the generated suffix index, and
   wherein the incoming data is allowed to pass or not based on the comparison of the second non-header portion.

2. The deep packet filter of claim 1, wherein the prefix search logic Concurrently compares the first non-header portion of the incoming data against a plurality of prefix patterns.

3. The deep packet filter of claim 2, wherein the prefix search logic concurrently compares a plurality of bytes of the first non-header portion of the incoming data against a plurality of bytes of each of the plurality of prefix patterns.

4. The deep packet filter of claim 3, wherein the prefix search logic concurrently compares a plurality of bytes of the first non-header portion of the incoming data against different byte alignments for each of the plurality of prefix patterns.

5. The deep packet filter of claim 1, wherein the prefix search logic includes a chain of decoders for detecting a particular substring of the prefix pattern.

6. The deep packet filter of claim 5, wherein the chain of decoders for detecting the particular substring are shared by a plurality of prefix search logic units configured to detect different prefix patterns that include the particular substring.

7. The deep packet filter of claim 1, wherein the prefix search logic, memory, means for generating the suffix index, and the comparator logic are implemented on a single field-programmable gate array.

8. The deep packet filter of claim 7, wherein the memory stores a list of sorted suffix patterns, wherein patterns in even entries of the list are stored from a first entry of the memory to a last entry, and patterns in odd entries of the list are stored from the last entry of the memory to the first entry.

9. The deep packet filter of claim 1, wherein the means for generating the suffix index includes means for generating each bit of the suffix index based on a logic equation derived from a binary tree of OR gates coupled to an output of the prefix search logic.

10. The deep packet filter of claim 1, wherein the prefix search logic indicates a byte alignment, and the comparator logic includes a shifter for shifting the second non-header portion of the incoming data according to the indicated byte alignment.

11. The deep packet filter of claim 1, wherein the first and second non-header portions of the incoming data are payload portions of the data.

12. The deep packet filter of claim 1, wherein the suffix index addresses a location of the memory storing the suffix pattern, and the comparator logic is configured to retrieve the stored suffix pattern from the addressed location to compare the second non-header portion of the incoming data against the retrieved suffix pattern.

13. A deep packet filtering method comprising:
 partitioning a plurality of patterns into a prefix portion and a suffix portion;
 storing the suffix portion of each of the plurality of patterns in a memory;
 concurrently comparing at least a portion of a first non-header portion of incoming data against at least a portion of the prefix portion of each of the plurality of patterns;
 generating a suffix index based on a match of the first non-header portion of the incoming data to a prefix portion of a particular pattern;
 identifying a suffix portion of the particular pattern stored in the memory based on the suffix index;
 comparing a second non-header portion of the incoming data against the identified suffix portion; and
 forwarding the incoming data or not, based on the comparison of the second non-header portion to the identified suffix portion.

14. The method of claim 13, wherein the concurrently comparing includes concurrently comparing a plurality of bytes of the first non-header portion of the incoming data against different byte alignments of the prefix portion of each of the plurality of patterns.

15. The method of claim 13, wherein the comparing is achieved via a chain of decoders configured to detect a particular substring.

16. The method of claim 15, wherein the chain of decoders for detecting the particular substring are shared by a plurality of prefix search logic units configured to detect different prefix portions of the plurality of patterns that include the particular substring.

17. The method of claim 13, wherein the memory is a read-only memory built-into a field-programmable gate array.

18. The method of claim 13, wherein the memory stores a list of sorted suffix portions of the plurality of patterns, wherein suffix portions listed in even entries of the list are stored from a first entry of the memory to a last entry, and suffix portions listed in odd entries of the list are stored from the last entry of the memory to the first entry.

19. The method of claim 13, wherein the generating of the suffix index includes generating each bit of the suffix index based on a logic equation derived from a binary tree of OR gates coupled to an output of a prefix search logic concurrently comparing the at least a portion of the first non-header portion of incoming data against the at least a portion of the prefix portion of each of the plurality of patterns.

20. The method of claim 13 further comprising:
 identifying a byte alignment associated with the match of the first non-header portion of the incoming data to the prefix portion of the particular pattern; and
 shifting the second non-header portion of the incoming data according to the indicated byte alignment.

21. The method of claim 13, wherein the first and second non-header portions of the incoming data are payload portions of the data.

* * * * *

UNITED STATES PATENT AND TRADEMARK OFFICE
CERTIFICATE OF CORRECTION

| | | |
|---|---|---|
| PATENT NO. | : 7,519,995 B2 | |
| APPLICATION NO. | : 11/587292 | |
| DATED | : April 14, 2009 | |
| INVENTOR(S) | : Young Hwan Cho et al. | |

It is certified that error appears in the above-identified patent and that said Letters Patent is hereby corrected as shown below:

Column 12, Claim 2, line 65    Delete "Concurrently",
                               Insert -- concurrently --

Column 14, Claim 17, line 25   Delete "built-into",
                               Insert -- built into --

Signed and Sealed this
Twenty-fifth Day of October, 2011

David J. Kappos
*Director of the United States Patent and Trademark Office*